US010482691B1

(12) United States Patent
McCluskey et al.

(10) Patent No.: US 10,482,691 B1
(45) Date of Patent: Nov. 19, 2019

(54) LOW-POWER, SECURE PASSENGER TRACKING SYSTEM

(71) Applicant: Expertise Products, LLC, San Diego, CA (US)

(72) Inventors: Cory McCluskey, San Diego, CA (US); Khang Nguyen, San Diego, CA (US); Joseph Nebolon, San Diego, CA (US)

(73) Assignee: Expertise Products, LLC, San Diego, CA (US)

( * ) Notice: Subject to any disclaimer, the term of this patent is extended or adjusted under 35 U.S.C. 154(b) by 0 days.

(21) Appl. No.: 16/414,531

(22) Filed: May 16, 2019

(51) Int. Cl.
*G08B 3/00* (2006.01)
*G07C 9/00* (2006.01)
*G08B 21/02* (2006.01)
*G06F 16/23* (2019.01)
*G06F 9/451* (2018.01)

(52) U.S. Cl.
CPC .............. *G07C 9/00* (2013.01); *G06F 9/451* (2018.02); *G06F 16/2379* (2019.01); *G08B 21/0227* (2013.01); *G08B 21/0275* (2013.01)

(58) Field of Classification Search
CPC ........... G07C 9/00; G06F 9/451; G06F 17/00; G08B 21/0227; G08B 21/0275; G08B 21/22; G08G 1/123; G08G 1/127
See application file for complete search history.

(56) References Cited

U.S. PATENT DOCUMENTS 9,576,491 B1 * 2/2017 Wu .................. G08G 1/127
2018/0292542 A1 * 10/2018 Anand ................ G01S 19/48

* cited by examiner

*Primary Examiner* — Toan N Pham
(74) *Attorney, Agent, or Firm* — ARC IP Law, PC; Joseph J. Mayo

(57) ABSTRACT

A passenger tracking system that combines fobs carried by passengers and a passenger detector that detects when a fob is nearby. The fobs are battery powered and consume very little power; therefore, they can be sealed and waterproof, and may last for years before replacement. A fob is asleep until awakened by a short-range magnetic field broadcast by the passenger detector. After awakening, the fob listens for an encrypted message from the passenger detector, and responds with an encrypted response that contains the fob's identity. Tracking is secure because a fob is completely invisible unless and until it receives a magnetic field of the correct frequency and time-varying pattern, and an encrypted request message from an authorized sender; responses are also encrypted so that listeners cannot discover the fob's identity. The system is suitable for example for tracking schoolchildren entering or exiting a school bus.

20 Claims, 13 Drawing Sheets

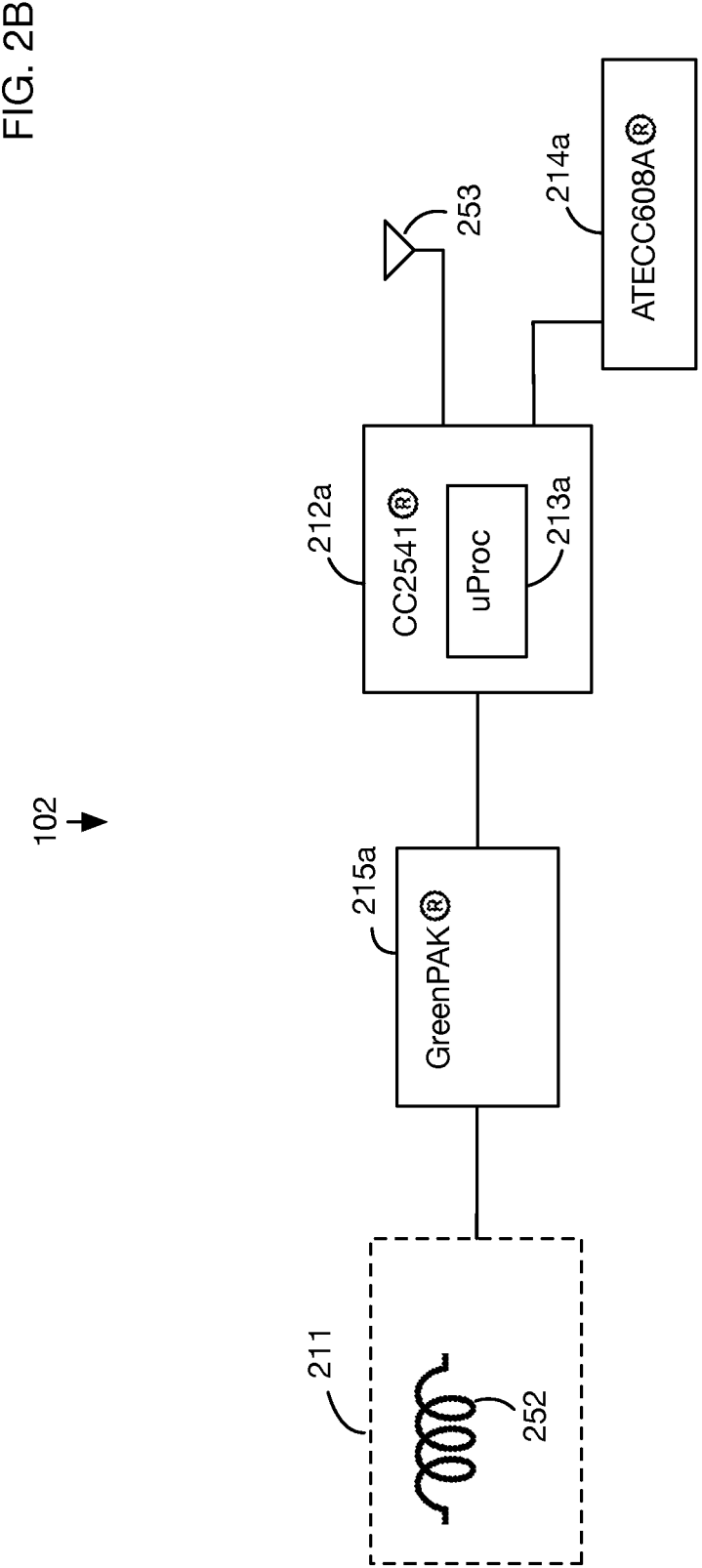

LOW-POWER, SECURE PASSENGER TRACKING SYSTEM

BACKGROUND OF THE INVENTION

Field of the Invention

One or more embodiments of the invention are related to the fields of wireless electronics, and tracking of persons or items using wireless communication. More particularly, but not by way of limitation, one or more embodiments of the invention enable low-power, secure passenger tracking system, which may be used for example to track passengers such as schoolchildren entering or exiting a bus or similar transportation vehicle.

Description of the Related Art

Tracking systems for people or items are known in the art. Examples include GPS systems and passive RFID tags. None of the existing technologies for tracking provide the convenience and security needed for an effective passenger tracking system. For example, a passenger tracking system may be desired to track schoolchildren as they enter or exit a school bus. Security is a primary concern for such a system, since allowing unauthorized users to track or snoop children's locations or identities could be dangerous. In addition, children are unlikely to comply with complex procedures such as submitting credentials for scanning at a bus door, so the system must provide tracking that detects entry and exit automatically. A token provided to a child that enables tracking must be simple to use and must not require recharging or battery replacement, so that it can be for example attached to an item like a backpack and left there for a long period of time without maintenance. The token must therefore consume very low power most of the time, which makes systems like GPS for example unsuitable for this application.

For at least the limitations described above there is a need for a low-power, secure passenger tracking system.

BRIEF SUMMARY OF THE INVENTION

One or more embodiments described in the specification are related to a low-power, secure passenger tracking system. The system may be used for example to track passengers entering or exiting a vehicle. A potential application may be for example tracking schoolchildren as they enter or exit a school bus.

One or more embodiments of the invention include a passenger detector in a vehicle, and a collection of fobs that may be detected when they are near the passenger detector. Each fob may be assigned to a corresponding passenger, and may be carried by, worn by, or otherwise coupled to that passenger. For instance, a student may put a fob in a backpack carried by the student. The fobs may be powered by a battery, and the fobs and the communication protocol between the fobs and the passenger detector may be configured so that the fobs draw only a very small amount of current from the battery when they are not in the range of a passenger detector. This low-power operation of the fobs may allow them to last several years with a single battery. Since the battery may not need to be replaced or recharged, the fobs may be sealed and waterproof.

In one or more embodiments the passenger detector and the fobs may communicate over two distinct channels. One channel may be a varying magnetic field broadcast by the passenger detector; the other may be a wireless electromagnetic channel that provides bidirectional messaging between the passenger detector and the fobs. The passenger detector and each fob may both have a processor, a wireless transceiver for the electromagnetic channel, and components for communication over the magnetic field channel. The fob's processor and wireless transceiver may each be configured to operate in either an awake mode or an asleep mode, where the asleep mode consumes less power from the battery than the awake mode. The magnetic field broadcast may be used to initiate wakeups of the fob processor and wireless transceiver.

The passenger detector may have a magnetic transmitter that is configured to repeatedly transmit a varying magnetic field that contains a pattern that the fobs may recognize. Each fob may have a magnetic receiver that is configured to receive the varying magnetic field and convert it to an electrical signal such as a voltage. This electrical signal may be transmitted to a pattern recognition circuit that tests whether the signal matches the expected pattern sent by the magnetic transmitter of the passenger detector. If the signal matches the pattern, the pattern recognition circuit may then transmit a processor wakeup signal to the fob's processor, causing the processor to transition to awake mode. The processor may then transmit a transceiver wakeup signal to the fob's wireless transceiver, causing the transceiver to transition to awake mode. The fob's transceiver may then receive any incoming messages and forward them to the processor, and may transmit any outgoing messages generated by the processor.

The processor of the passenger detector may repeatedly transmit an encoded request identity via the detector's wireless transceiver. Once the fob's processor and wireless transceiver are awake, they can receive and decode this message, and generate an encoded response that includes the fob's identifier, which may be stored in a memory coupled to the processor. The fob may then transmit this encoded response to the passenger detector via its wireless transceiver. When the passenger detector processor receives this message via its wireless transceiver, it may decrypt it to obtain the fob's response message that contains the fob identifier. It may then transmit a fob detected message that contains or is derived from the fob identifier. This fob detected message may be sent for example to one or more computers or displays.

In one or more embodiments, the magnetic transmitter of the passenger detector may be configured to transmit a varying magnetic field with a field strength that decreases as the distance from the transmitter increases. When this field strength falls below a field strength threshold, the magnetic receiver of the fobs may be configured to not respond to the field. The field strength may fall below the field strength threshold at a distance threshold, which may be for example two meters or less. In one or more embodiments the field strength may decrease approximately as the inverse cube of the distance from the magnetic transmitter.

In one or more embodiments, the magnetic transmitter may include one or more inductors driven by an alternating current. The frequency of this alternating current may be different from the frequency used by the wireless transceivers. The alternating current frequency may be for example at or below 9 kilohertz. In one or more embodiments the inductors may include three inductors that are substantially perpendicular.

In one or more embodiments the varying magnetic field pattern may contain a sequence of two or more bits, where a one bit is transmitted by coupling the alternating current to the inductor or inductors, thereby generating a field, and a zero bit is transmitted by decoupling the alternating current from the inductor, thereby generating no magnetic field.

In one or more embodiments the magnetic receiver of the fob may include an inductor. The inductor may be in a resonating circuit with a capacitor, and the resonant frequency of the resonating circuit may match the frequency of the alternating current of the magnetic transmitter.

In one or more embodiments, the magnetic receiver may include an amplifier, and the battery of the fob may be coupled to the magnetic receiver, for example to power the amplifier. The current drawn from the battery by the magnetic receiver may be for example one microamp or less.

In one or more embodiments, the pattern recognition circuit may be or may include an FPGA. The FPGA may be coupled to the battery, and it may draw for example one microamp or less from the battery.

One or more embodiments may include a computer that is coupled to a database of passenger states, and to a user interface. There may be a network connection between the passenger detector and the computer, and the fob detected message may be transmitted over this connection. The computer may update the database of passenger states when it receives this fob detected message, and it may display information from the database on the user interface. In one or more embodiments the computer may be a server remote from the passenger detector. The user interface may be for example a web page. The user interface may be instead or in addition a display in the vehicle.

In one or more embodiments, the passenger detector may be located at or near a passage through which passengers enter and exit the vehicle. The computer may determine whether a fob detected message indicates a passenger entry or a passenger exit.

One or more embodiments may have a user interface control, such as a button for example, at the end of the vehicle opposite the passage. When the user interface control is activated, it may send a vehicle empty confirmation message to the computer, and the computer may update the database of passenger states based on this message.

BRIEF DESCRIPTION OF THE DRAWINGS

The above and other aspects, features and advantages of the invention will be more apparent from the following more particular description thereof, presented in conjunction with the following drawings wherein:

FIG. 2B shows a circuit block diagram with illustrative components for an embodiment of a fob.

DETAILED DESCRIPTION OF THE INVENTION

A low-power, secure passenger tracking system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
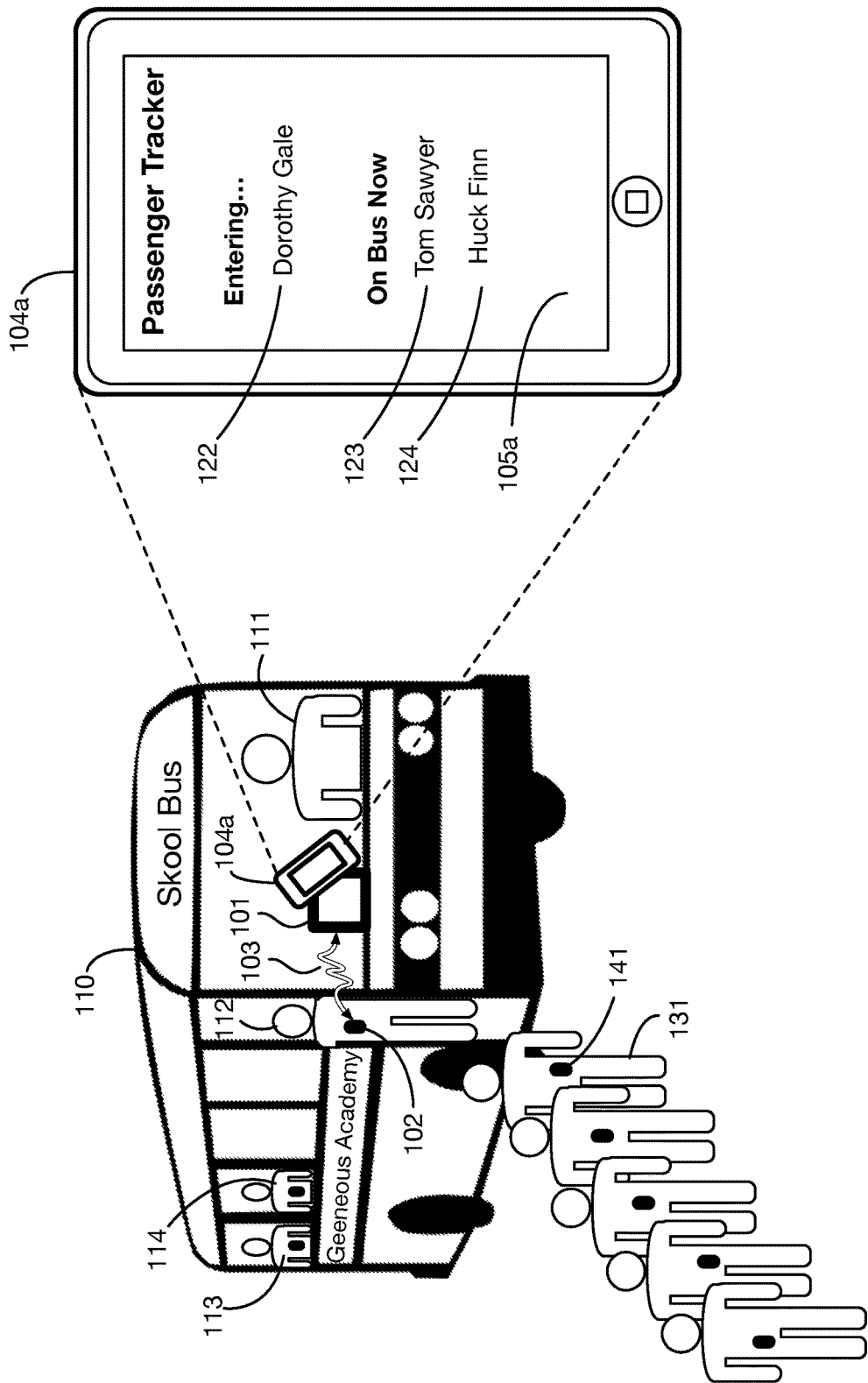
FIG. 1 illustrates an embodiment of the invention with a passenger detector at the entrance to a school bus; each student has a fob that communicates with the passenger detector to show that this student is entering or exiting the bus.

FIG. 1 shows an embodiment of the system used for tracking school children on a school bus 110. The system includes a passenger detector 101, mounted near the door to the bus, and fobs such as fobs 102 and 141 that are carried by, worn by, attached to, in an item carried by or worn by, or otherwise coupled to a passenger or potential passenger. The system may include any number of fobs associated with any number of passengers or potential passengers or with any other types of users. In the illustrative scenario shown, fob 102 is coupled to passenger 112, and fob 141 is coupled to passenger 131. The fobs may be for example small, self-contained units that may be placed for example, without limitation, into or onto a backpack, a notebook, a pocket, a watch, a piece of jewelry, a mobile phone case, a keychain, a lunchbox, or an item of clothing. The fobs communicate with the passenger detector 101 via messages 103, described below, to announce and confirm the passenger's entry onto or exit from the bus. Each fob has an associated identifier that may be for example associated with a passenger, so that the passenger detector or an attached computer can determine which passenger is detected. The communications between the passenger detector and the fobs are configured to be secure and to support low power consumption by the fob. Security of the communications ensures that other unauthorized entities cannot detect the presence of the person coupled to a fob. The low power consumption by the fobs may allow the fobs to be configured with a battery that may for example last for many years without replacement or recharging.

One or more embodiments of the system may also include a computer, such as tablet 104a, that receives data from the passenger detector 101. The computer may be any type of device, including for example, without limitation, a tablet, a phone, a laptop, a desktop, a kiosk, or a customized system. In the illustrative embodiment shown in FIG. 1, the tablet 104a may be used by the bus driver 111 to review and potentially edit information on the passengers. For example, the display 105a of tablet 104a may show the name 122 of the passenger 112 who is currently entering the bus, as well as the names 123 and 124 of passengers 113 and 114 who have previously entered the bus. This user interface is illustrative; one or more embodiments may display any type of information on any screen or screens. In one or more embodiments an operator such as driver 111 may use the user interface of a computer or coupled display to confirm, review, edit, clear, or otherwise modify the information on passengers.

Figure 2:
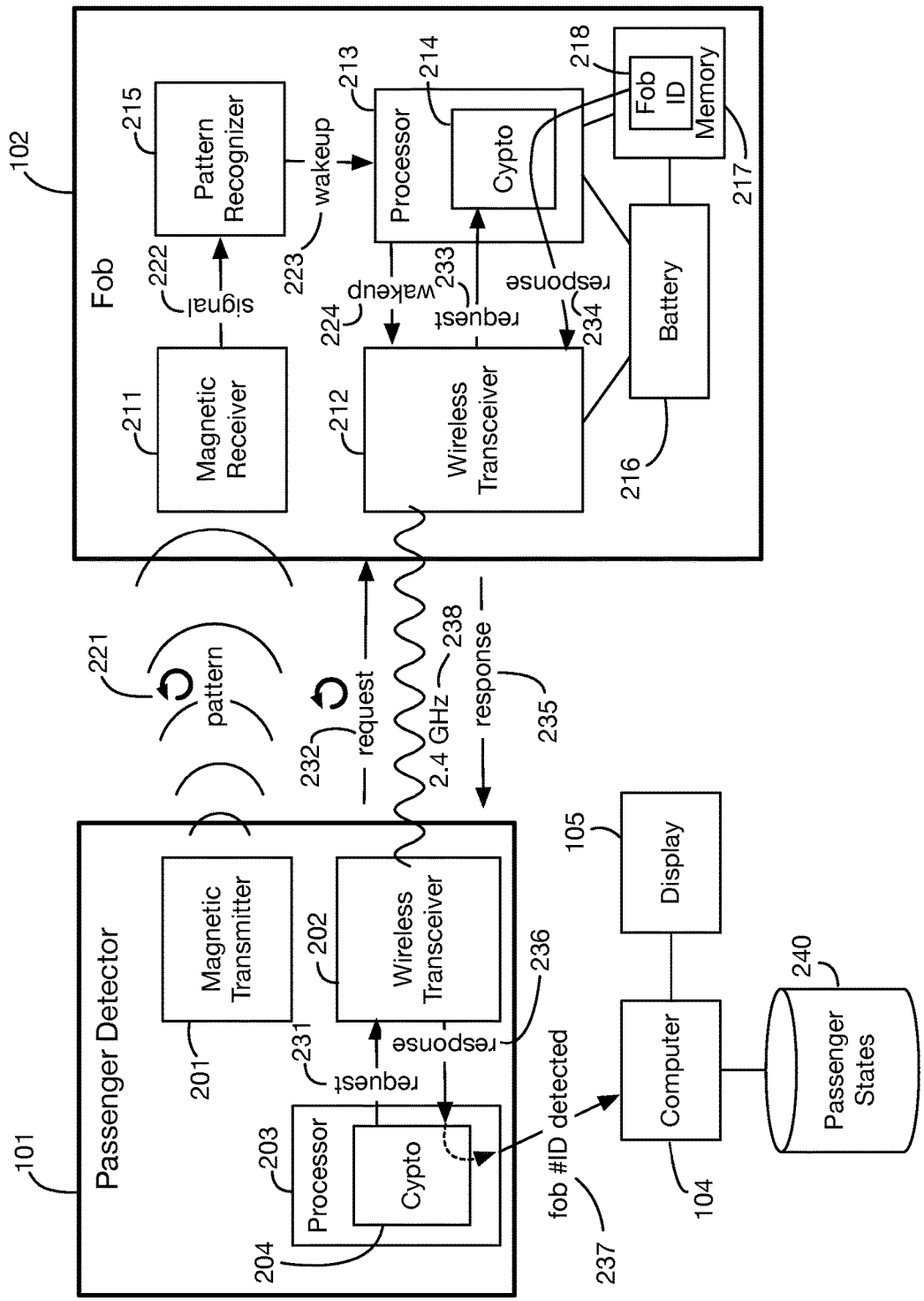
FIG. 2 shows an architectural block diagram of an embodiment of the invention.

FIG. 2 shows an architectural block diagram for components of an illustrative embodiment of the invention, including components of illustrative passenger detector 101 and illustrative fob 102. In this embodiment, the passenger detector 101 and fob 102 communicate via two different types of signals. One signal is a varying magnetic field 221 that is broadcast from the passenger detector 101 and is received by the fob 102. The second type of signal is electromagnetic; the passenger detector transmits a request 232 for fob identity, and the fob responds with a response 235 that includes the fob identity. This use of two types of signals, one a magnetic field and the other an electromagnetic signal, provides several benefits. First, in one or more embodiments the magnetic field 221 produced by the magnetic transmitter 201 of the passenger detector 101 may effectively act approximately as a point source centered on the location of the magnetic transmitter. The strength of the magnetic signal 221 may therefore fall approximately by the cube of the distance from the point source, approximating a sphere-shaped volume with a size proportional to the signal strength. The magnetic field is therefore at least approximately isotropic, which facilitates installation, configuration, and detection. (In contrast, the directional nature of many electromagnetic signals and antennas could potentially create issues for detection or configuration if detection relied exclusively on electromagnetic signals; for example, a fob that was near a detector might not be detected if it were in a zone or orientation with a weak electromagnetic signal or poor reception by the fob antenna.) Second, magnetic fields do not reflect or focus in the manner of electromagnetic fields; this feature is important in this application because of the need to tightly confine the area where a fob can be activated. For example, the passenger detector in a school bus application should not detect children walking or standing just outside the entrance to the bus, yet the passenger detector should detect children as they board and approach the driver. Establishing a limited and reliable zone of detection may be easier with a magnetic field than with an electromagnetic field that may propagate, reflect, or interfere in unpredictable ways. Third, the fobs may be configured to use the varying magnetic field to provide power that triggers a wakeup of the fob circuits, as described below, thereby allowing the fobs to consume very little power. Fourth, the electromagnetic signals provide a channel for transmission of encrypted messages with any information needed to securely request a fob identity and to securely respond to this request.

Turning now to the internal architectures of the illustrative passenger detector 101 and fob 102, the passenger detector has a magnetic transmitter 201 that transmits the varying magnetic field 221, and the fob has a corresponding magnetic receiver 211 that receives this field. In one or more embodiments the magnetic transmitter 201 repeatedly transmits a pattern in the magnetic field 221. This pattern may for example consist of bursts of magnetic field with interspersed periods of no transmission. The pattern may be configured so that it is unlikely that other potential sources of magnetic fields, such as electromechanical equipment, would generate similar patterns of time-varying magnetic fields. The magnetic receiver receives the magnetic field signal 222 and transmits it to a pattern recognizer circuit 215, which determines whether the received magnetic field matches the expected pattern sent by the passenger detector's magnetic transmitter 201. If the received signal matches the expected pattern, then the pattern recognizer 215 sends a wakeup signal 223 to processor 213 of the fob. This processor is normally in an asleep mode to conserve power, and it transitions to an awake mode on receiving the wakeup message 223. When processor 213 wakes up, it in turn sends a wakeup signal 224 to wireless transceiver 212, which also has an asleep mode to conserve power and an awake mode to enable receiving and transmitting electromagnetic signals. Once the processor 213 and transceiver 212 are awake, they begin listening for request messages from the passenger detector.

Passenger detector 101 has a processor 203 and a wireless transceiver 202. The processor 203 repeatedly generates messages 231 for broadcast. These request messages 231 may be encrypted, so that they are only recognized by fobs able to decrypt the request. Encryption of the request message 231 may for example be performed by a cryptographic processor 204 embedded in or coupled to processor 203. The message 231 is sent to wireless transceiver 202 for broadcast as request message 232 over the electromagnetic wireless channel. This channel may use any desired frequency or frequencies, including for example frequency 238 of a standard Wi-Fi 802.11 channel.

When wireless transceiver 212 of fob 102 receives a message 232, it forwards it as message 233 to processor 213. Processor 213 may decrypt the message to determine if it is a request for a fob identifier from a passenger detector. The decryption may use a cryptographic processor 214 embedded in or coupled to processor 213. If the decrypted message is a valid request message, the processor may generate a response 234 that contains fob identifier 218, which may be stored in a memory 217 coupled to processor 213. This response 234 may be encrypted by processor 213 or by a cryptographic processor 214. The response 234 is then transmitted over the wireless electromagnetic channel by wireless transceiver 212 as response 235. This response is received by the wireless transceiver 202 of passenger detector 101, and forwarded as response message 235 to processor 203. The processor 203 or the cryptographic processor 204 decrypts the message to recover the original response containing the fob identifier. The passenger detector 101 thereby knows that the fob with this identifier is in the vicinity of the passenger detector.

After obtaining the fob identity, the passenger detector 101 may forward this information to one or more computers 104 with a fob detected message 237 that contains the fob identifier, or that contains any other information derived from or associated with this fob identifier. (Derived information may for example include the name of the passenger associated with the fob, if this association is accessible to the passenger detector.) This computer or computers 104 may be any type of computer or processor, including for example, without limitation, a desktop, a server, a laptop, a notebook, a tablet, a phone, a smart watch, smart glasses, a customized circuit, or a network of any of these computers. The computer or computers 104 that receive the information 237 may be either in the bus or other vehicle, or remote from the vehicle. Message 237 may be sent over a network connection or connections of any types, including either or both of a local and remote connection. Computer or computers 104 may have display or displays 105, which may be coupled to the computer via local or remote connections. Information about data 237 may be displayed on the display(s) 105. This data may be stored in a database 240 of passenger states. The database may be local to or remote from the bus or other vehicle containing the passenger detector 101. The database may be any type of storage or memory that tracks fob identifiers and any related passenger information.

Encryption of request messages 232 and response messages 235 ensure that only authorized systems can discover and track fobs and their associated passengers. Fobs remain completely silent, and thus invisible, until and unless they receive both the correct magnetic field pattern 221 and then the encrypted request message 232. Even if an attacker managed to forge these signals, and obtain a response message from a fob, the response message itself is encrypted so that the fob identity remains hidden. Without security features such as these, the presence or movements of fob holders could be tracked by stores, advertisers, or potential predators. The security of the passenger detection system is therefore an important benefit of the invention, particularly for vulnerable populations such as schoolchildren.

Figure 2A:
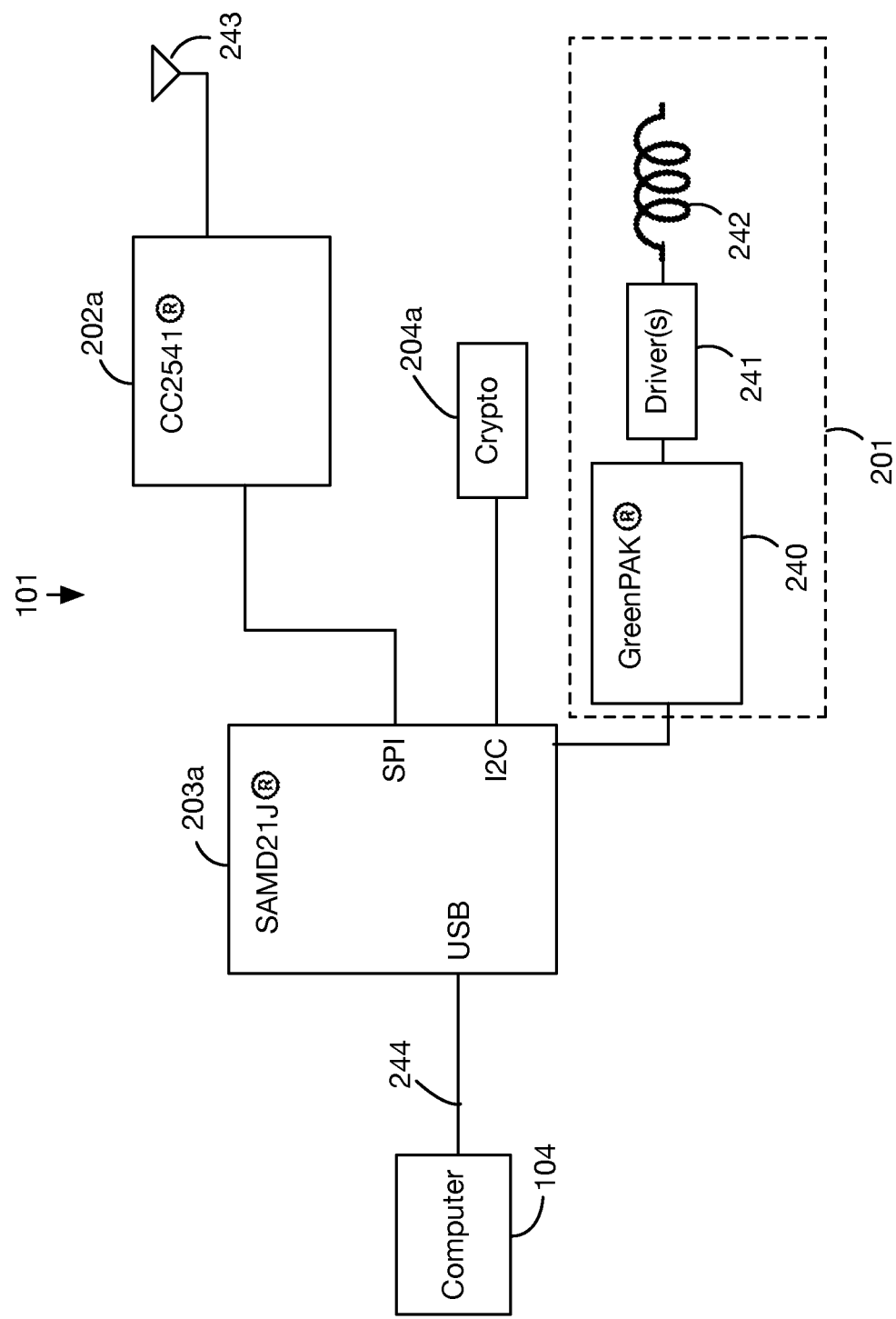
FIG. 2A shows a circuit block diagram with illustrative components for an embodiment of a passenger detector.

FIGS. 2A and 2B show illustrative circuit block diagrams and illustrative components for an embodiment of a passenger detector 101 and an embodiment of a fob 102, respectively. Passenger detector 101, shown in FIG. 2A, may for example have a microcontroller 203a as its processor, which may for example be a Microchip SAMD21J® microcontroller. This microcontroller may have a USB port or similar communications port for communication with an external computer or computers 104 over a USB connection 244. The microcontroller 203a may be connected to a wireless transceiver such as for example transceiver 202a, which may be for instance a Texas Instruments CC2541® 2.4 GHz transceiver (which also supports Bluetooth Low Energy transmission). This transceiver 202a may be connected to an antenna 243. Microcontroller 203a may also be connected to a cryptographic processor 204a. It may also be connected to a circuit that drives the magnetic transmitter 201. This magnetic transmitter may include a programmable mixed-signal FPGA, such as a Dialog Semiconductor GreenPAK®, a signal driver 241, and one or more inductors 242 or similar magnetic devices. Fob 102, shown in FIG. 2B, may have a magnetic receiver 211 that includes one or more inductors 252 or similar magnetic devices, a mixed signal FPGA 215a, such as a Dialog Semiconductor GreenPAK®, and a wireless transceiver 212a. The illustrative circuit shows wireless transceiver 212a as a Texas Instruments CC2541® 2.4 GHz transceiver, which pairs with the transmitting transceiver 202a in the passenger detector. This transceiver 212a may also include a microcontroller or equivalent functionality 213a. The transceiver/processor 212a may be connected to antenna 253 and to a cryptographic chip such as a Microchip ATECC608A®. The components shown in FIGS. 2A and 2B are illustrative; one or more embodiments may use any components that provide the functionality of the passenger detector and the fob.

Figure 3:
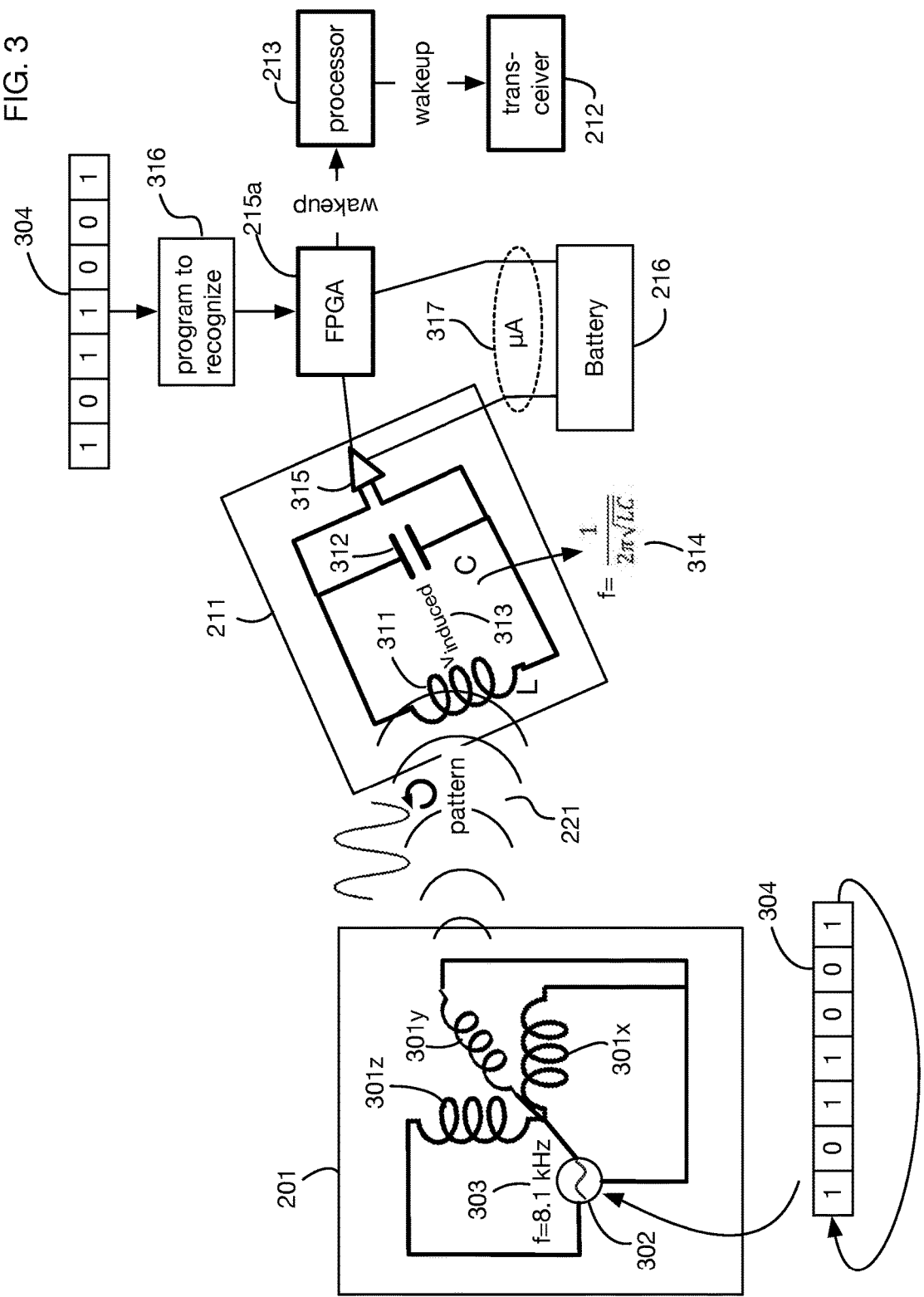
FIG. 3 shows an illustrative magnetic transmitter with three perpendicular inductors, and a corresponding magnetic receiver in a fob with a receiving inductor in an LC circuit tuned to the frequency of the AC signal transmitted through the magnetic transmitter.

FIG. 3 shows an illustrative magnetic transmitter 201 and magnetic receiver 211 that may be used in one or more embodiments of the invention. A time-varying magnetic field may be generated by an inductor fed by an alternating current. This varying magnetic field may in turn generate an induced voltage in a receiving inductor, as occurs in a transformer for example. However, efficient generation of an induced voltage requires that the transmitting and receiving inductors be substantially parallel. Since in operation the fobs may be at any angle relative to the passenger detector, effective transmission of an induced signal from a magnetic field may not occur if the magnetic transmitter 201 and magnetic receiver 211 each contain only a single inductor. The inventors have therefore discovered that use of three perpendicular inductors in the magnetic transmitter 201 allows for effective transmission in any relative orientation between the transmitter 201 and the receiver 211. This is illustrated in FIG. 3 where magnetic transmitter 201 has three perpendicular inductors 301$x$, 301$y$, and 301$z$, attached to an alternating current source 302. The magnetic receiver 211 has a single receiving inductor 311 in this embodiment. In one or more embodiments the magnetic transmitter 201 may contain a single inductor, and the magnetic receiver 211 of the fob may contain three perpendicular inductors; however, use of a single inductor in the fob receiver may allow the fob to be smaller and lower cost.

In the embodiment shown, alternating current source 302 oscillates at frequency 303 of 8.1 kHz. This particular frequency is illustrative; one or more embodiments may use any desired frequency. A lower frequency such as 8.1 kHz may offer the benefit of being outside regulated frequency bands. The frequency 303 of the alternating current source that drives the time-varying magnetic field may be different from the frequency 238 of the wireless electromagnetic signals so that these two signals, magnetic and electromagnetic, do not interfere with one another. The receiving inductor 311 could generate an induced voltage with any time varying magnetic field of any frequency, including magnetic fields generated from other equipment running on AC power. However, it is not desirable for the fob to respond to magnetic fields from sources other than the magnetic transmitter 201. Therefore, the receiving inductor 311 is coupled to a capacitor 312 to form a resonator circuit that is tuned to frequency 314 that matches the transmitter frequency 303. This resonance makes the magnetic receiver selective for the transmitted frequency so that the fob is less likely to wake up in response to stray fields.

The magnetic transmitter 201 transmits a pattern such as for example bit sequence 304. This sequence may for example switch on and off the source 302, with a 1-bit turning the source on and a 0-bit turning the source off. The magnetic receiver converts the received varying magnetic to an electric signal, such as an induced voltage, and transmits this electrical signal to a pattern recognizer such as an FPGA 215a. This FPGA may be programmed in step 316 to recognize the same sequence 304. The wakeup signal may be sent from the FPGA 215a to processor 213 (and then from the processor to transceiver 212) only if the FPGA determines that the incoming signal matches the pattern 304. The bit sequence 304 shown is illustrative; one or more embodiments may use any pattern or any bit sequence.

The fob may be configured to consume a very small amount of power until the correct magnetic field pattern at the correct frequency is received. The received magnetic field may induce a voltage in the receiving inductor 311; this voltage may be amplified by a low-power amplifier 315, and then transmitted as an amplified electrical signal to the FPGA. The amplifier 315 and FPGA may draw current 317 from battery 216, which may be on the order of microamps. For example, in one or more embodiments the current draw 317 may be one microamp or less. This very low current draw while the processor and transceiver are asleep allows a small battery 216 to provide many years of service. Fobs may therefore be configured to require neither replacement nor recharging of the battery. As a result, the fobs may be completely sealed and waterproof, since no external ports or serviceable parts need to be accessible.

Figure 4:
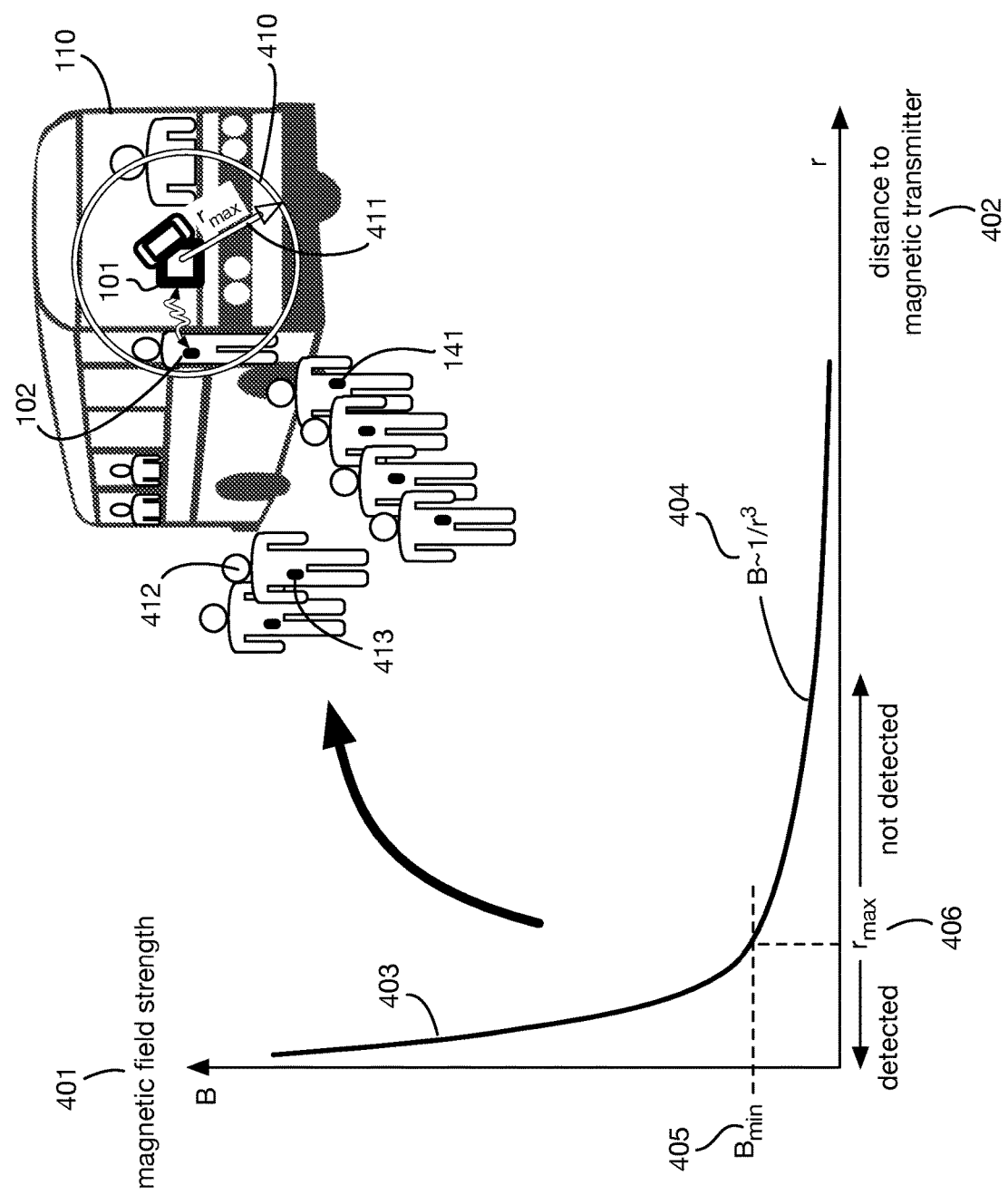
FIG. 4 shows an illustrative profile of the strength of the transmitted magnetic field as a function of the distance from the transmitter; in this illustrative embodiment, a rapidly declining field strength ensures that fobs are detected only when they are near the transmitter.

The magnetic field strength outside of an inductor decreases approximately with the cube of the distance from the inductor. Because of this rapidly declining field strength, the effective range of the magnetic signal from the magnetic transmitter of the passenger detector is limited. This limited range may be beneficial in situations where it desirable to detect passengers only as they pass near to the passenger detector, such as at the entrance of a bus or other vehicle. This phenomenon is illustrated in FIG. 4. The magnetic field strength 401 as a function of the distance 402 from the magnetic transmitter of the passenger detector is represented in curve 403, which may decline rapidly, for example as the inverse cube 404 of the distance. The fobs' magnetic receivers may be configured to respond only when the received magnetic field strength is at least a minimum threshold 405; this minimum threshold is exceeded when the distance to the transmitter is below a distance threshold 406. For the bus scenario illustrated in FIG. 1, this distance threshold 406 generates a radius 411 for a detection sphere 410 centered at the magnetic transmitter of passenger detector 101. Fobs within this sphere 410 will respond, such as fob 102. Fobs outside the sphere will not respond to the magnetic signal because it is below the threshold 405 outside sphere 410. This limited range ensures that people in the vicinity of the vehicle, who may not even intend to enter the vehicle, are not accidentally detected. For example, person 412 may be a pedestrian who is walking past bus 410; the fob 413 on this person is outside the sphere 410 so it does not respond to the magnetic signal. Similarly fob 141 on a passenger waiting to enter the bus does not respond until the person is at the door of the bus. The optimal radius 411 of detection may depend on the application of the system. For the bus application, the radius 411 and distance threshold 406 may be for example two meters or less. For some applications a larger radius may be appropriate. The radius may be configured for example by changing the strength of the field transmitted by the magnetic transmitter, by changing the size of the inductors or the current flowing through them. In one or more embodiments the radius may be configurable in the field (at installation or thereafter), for example by modifying parameters such as the amount of current flowing through the inductors. The radius may therefore be customized for the specific type of passenger detection needed in each environment.

Figure 5:
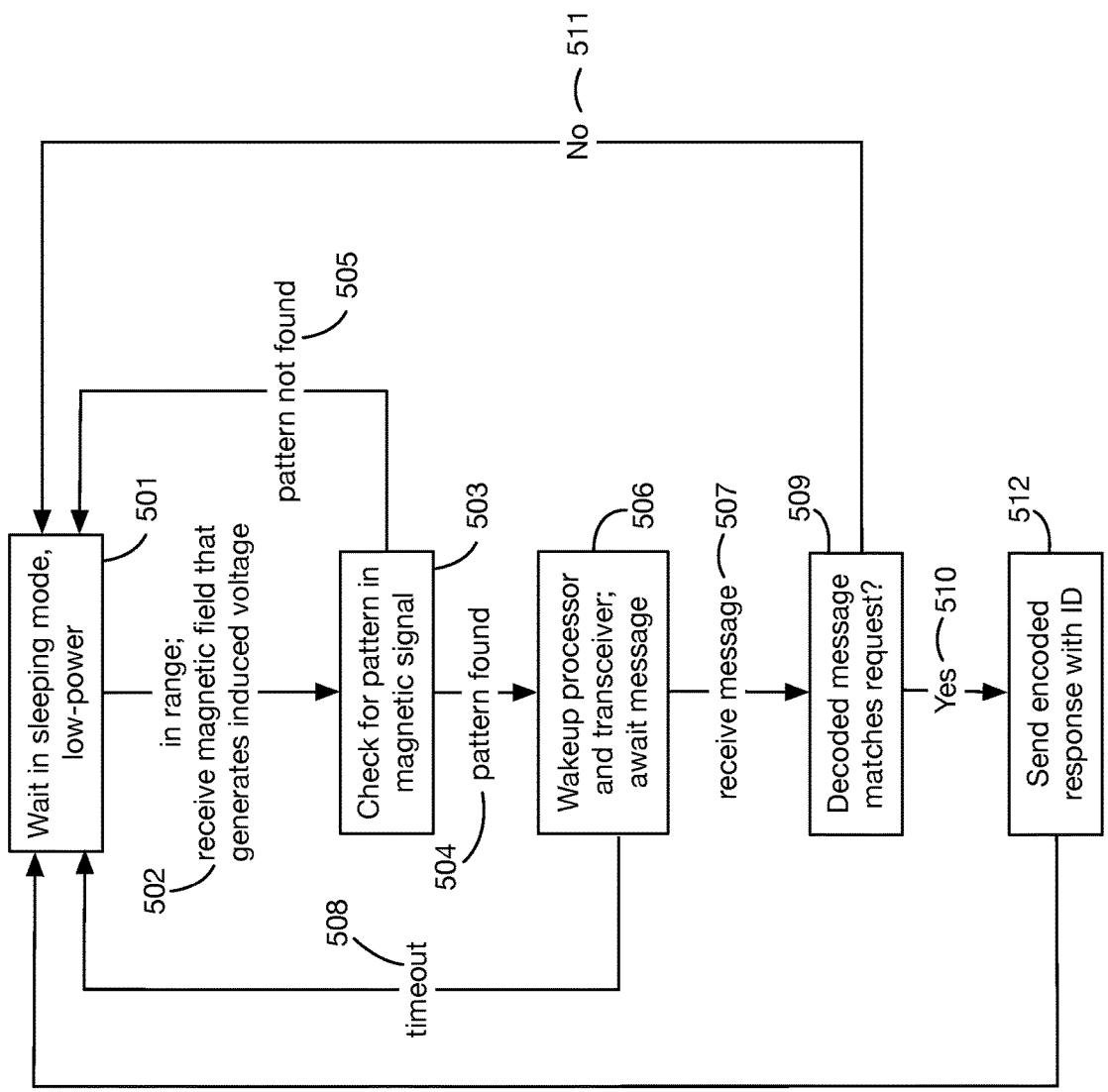
FIG. 5 shows an illustrative flowchart for states and transitions of a fob as it receives transmissions from the passenger detector.

FIG. 5 shows a flowchart of illustrative states and transitions of an embodiment of a fob. The fob is typically in a sleeping state 501. This is a low-power state, with the processor and wireless transceiver asleep. When the fob comes in range of a magnetic transmitter, the received magnetic field causes transition 502 that initiates step 503 to check for the expected pattern in the magnetic signal. If the pattern is not found, the fob transitions 505 back to sleeping state 501. If the pattern is found, the fob transitions 504 to state 506 with the processor and wireless receiver awake and awaiting a message over the electromagnetic channel. If no message is received after a period of time, a timeout transition 508 occurs and the fob returns to sleeping state 501. If a message is received 507, step 509 checks whether the decoded message is a valid request for a fob identity. If not, the fob transitions 511 back to the sleeping state. If the message is a valid request, the fob transitions 510 to step 512, which sends and encoded response with the fob identity back to the passenger detector, and the fob then transitions back to the sleeping state 501. These states, steps, and transitions are illustrative; one or more embodiments may perform steps in different orders or employ other or different states and transitions.

Figure 6:
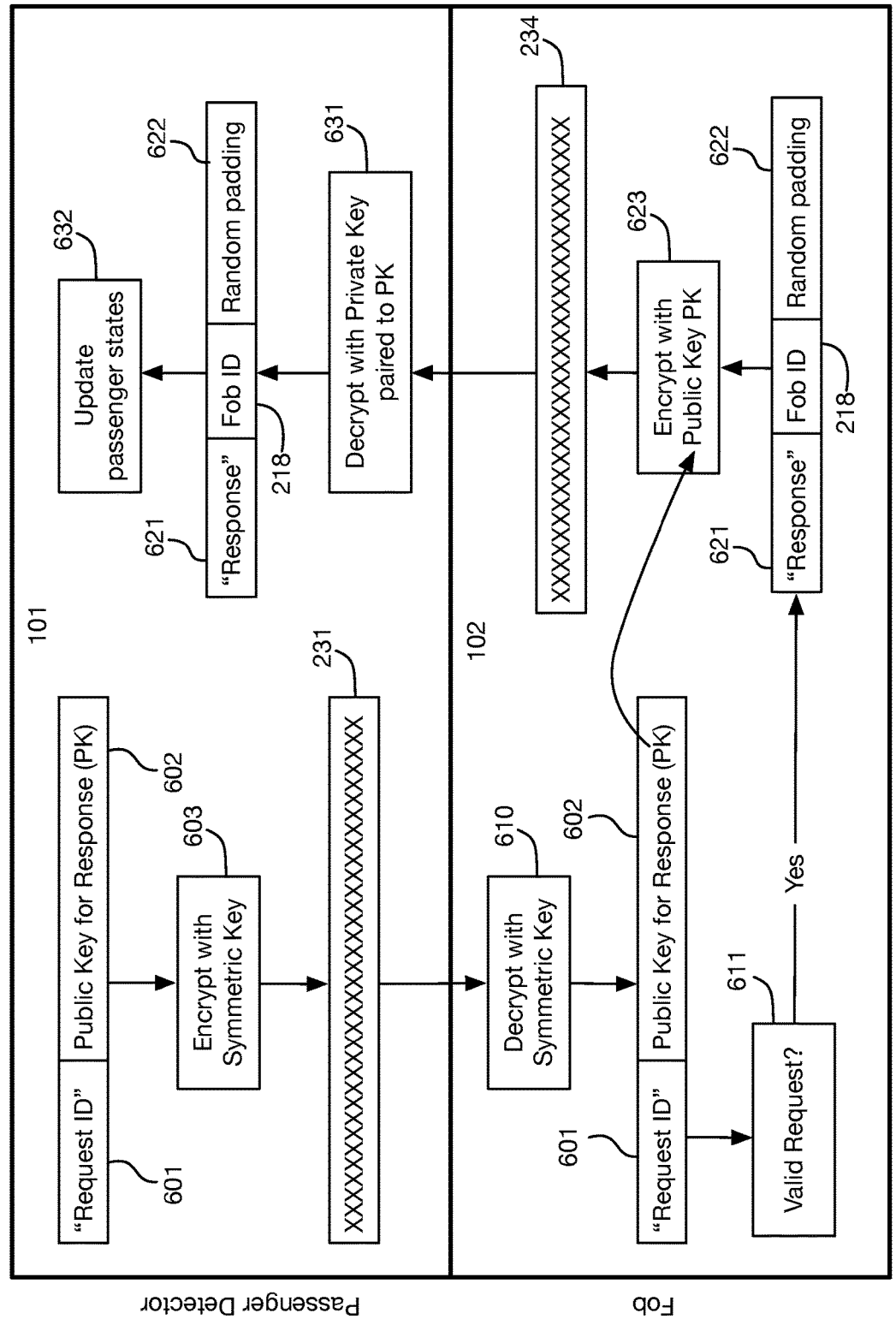
FIG. 6 shows illustrative messages exchanged between the passenger detector and a fob.

FIG. 6 shows an illustrative flow of messages between passenger detector 101 and fob 102 over the electromagnetic channel. The passenger detector creates or accesses a request message that includes a request code 601 and the public key 602 of a public-private key pair. The fob will respond using this public key, and the passenger detector uses its private key to decode the response. The request message is encrypted, for example with a symmetric key known to both the passenger detector and the fob, to generate encrypted request message 231. This message is sent to the fob, which decrypts it in step 610 to recover the request message. The request code 601 is checked to confirm that it is a valid request. The fob then generates a response message containing a response code 621, the fob's ID 218, and random padding 622. The random padding makes each response unique, so that an unauthorized listener cannot track a fob by looking for repeated messages from that fob. The fob encrypts the response message in step 623 using the public key 602 of the passenger detector. Because the public key is sent in the request message, the fob can respond to different passenger detectors using each detector's public key. The encrypted response 234 is sent to the passenger detector, which decrypts it in step 631 using its private key to recover the response message. The fob ID 218 is then used to update passenger states in step 632, or it is transmitted to one or more other computers.

Figure 7:
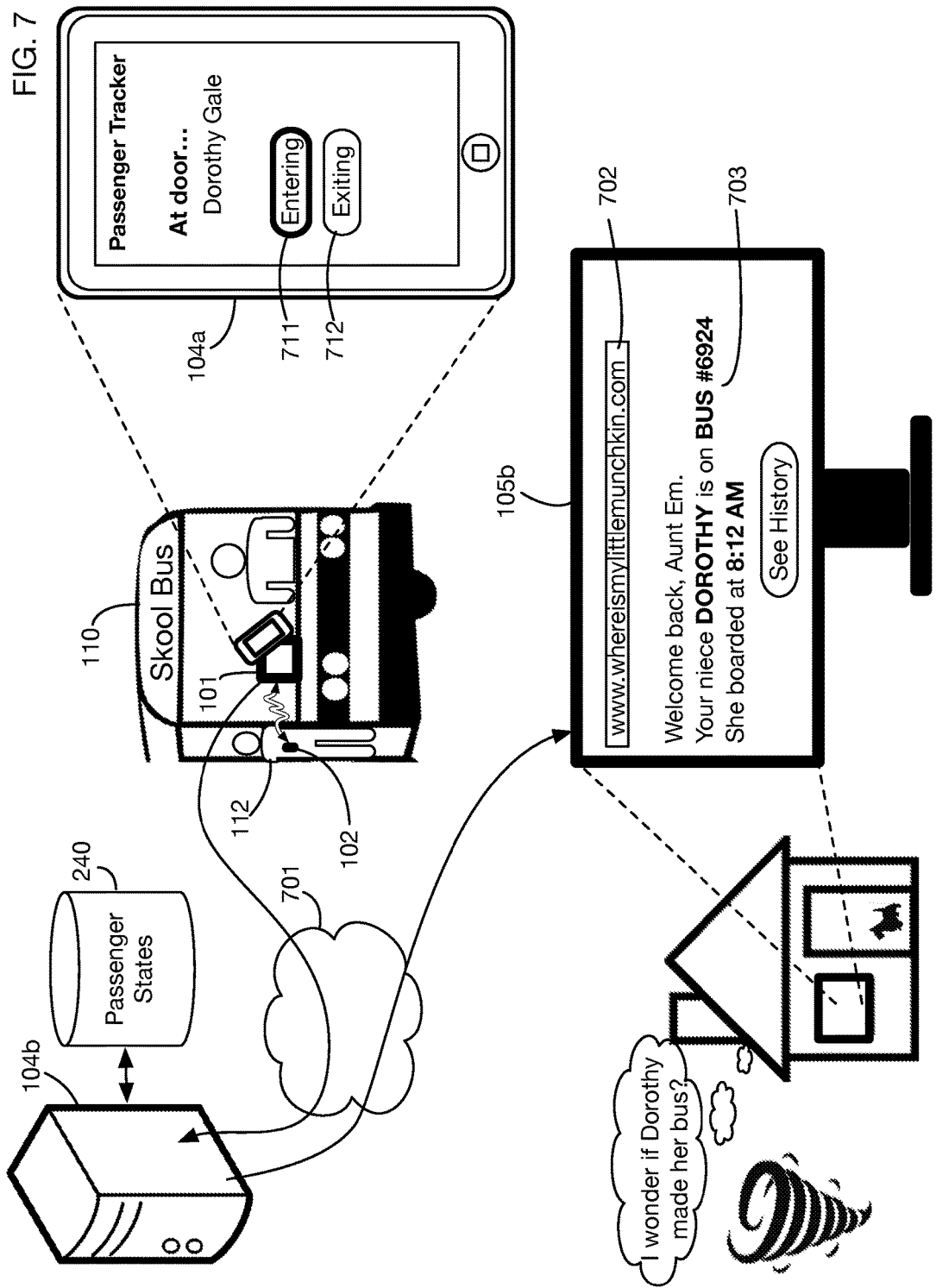
FIG. 7 shows an embodiment of the invention that transmits passenger states to a server, and that provides a user interface to browse the state of a passenger from a remote location.

As illustrated in FIG. 2, the passenger detector may transmit the fob ID of any detected fob to one or more computers 104. These computers may include the tablet 104a of FIG. 1 used by bus operator 111, but they may also or alternatively be computers that are remote from the vehicle. These other computers may be used to track passengers and to update other persons on the status of the passengers. For example, a parent or guardian may be able to view the information to determine whether or when a child is on a bus. This process is illustrated in FIG. 7. Passenger detector 101 detects fob 102 of passenger 112, and transmits this detection information to tablet 104a and transmits it over network 701 to a remote server 104b. Network 701 may be for example a cellular network connected to an Internet gateway. Server 104b updates a database 240 of passenger states. An authorized user may connect to the server 104b for example via a website 702 using a remote display 105b to receive and view an update 703 of the state of a particular passenger. In one or more embodiments, multiple remote users may be authorized to view passenger state information; these users may include for example, without limitation, parents and guardians of schoolchildren, school administrators, police agencies, and bus operating company personnel.

Figure 8:
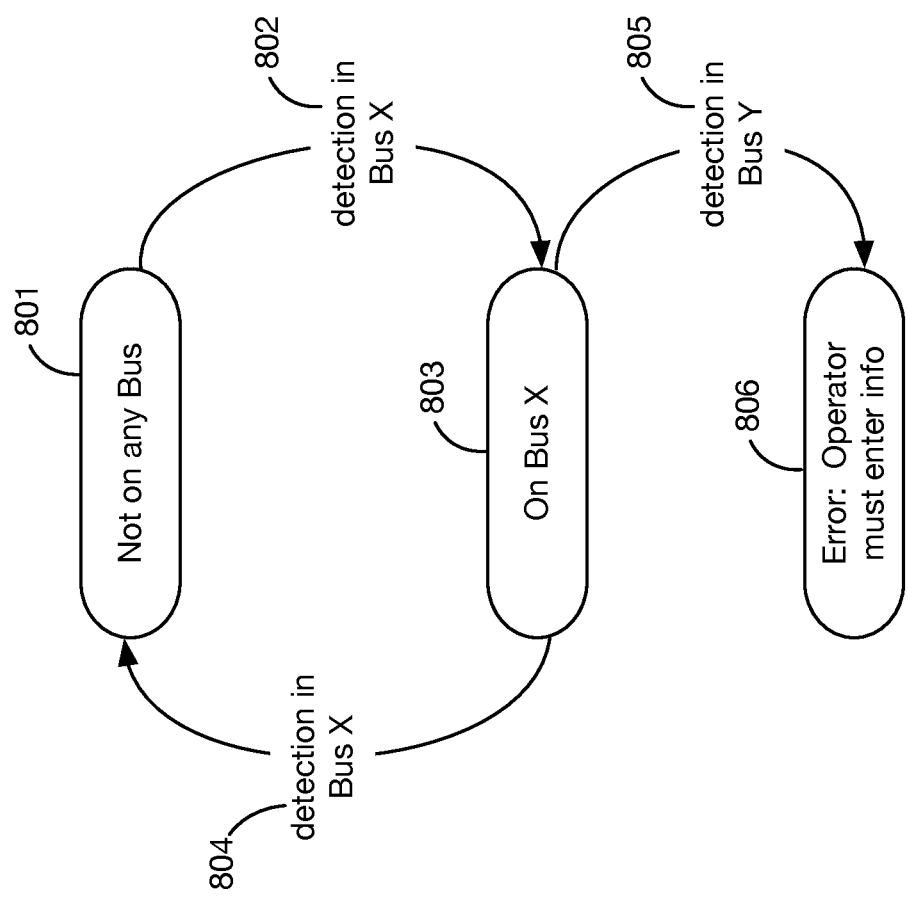
FIG. 8 shows an illustrative state transition diagram that enables automatic or semi-automatic determination of whether a passenger is entering or exiting a vehicle.

FIG. 7 also illustrates a different user interface for tablet 104a from the one shown in FIG. 1. In this user interface, the passenger detector determines that a person is at the door of the bus, but the bus operator must manually indicate whether the person is entering the bus or exiting the bus, via buttons 711 and 712. This determination of whether a detection represents an entry or an exit may be partially or fully automated in one or more embodiments. For example, one or more embodiments may have multiple detectors near a door so that passengers must pass by them in sequence; the order in which the detections occur may indicate whether the passenger is entering or exiting. FIG. 8 shows another illustrative method that may be used to differentiate between entry and exit. The state of each passenger is tracked, and it is assumed that initially the passenger is in state 801, not on any bus. The first detection 802 is presumed to be an entry, putting the passenger in state 803. A second detection 804 from the same passenger detector on the same bus is then presumed to be an exit, returning the passenger to state 801. If a second detection 805 is from a different passenger detector on a different bus, then an operator may need to correct the passenger state.

Figure 9:
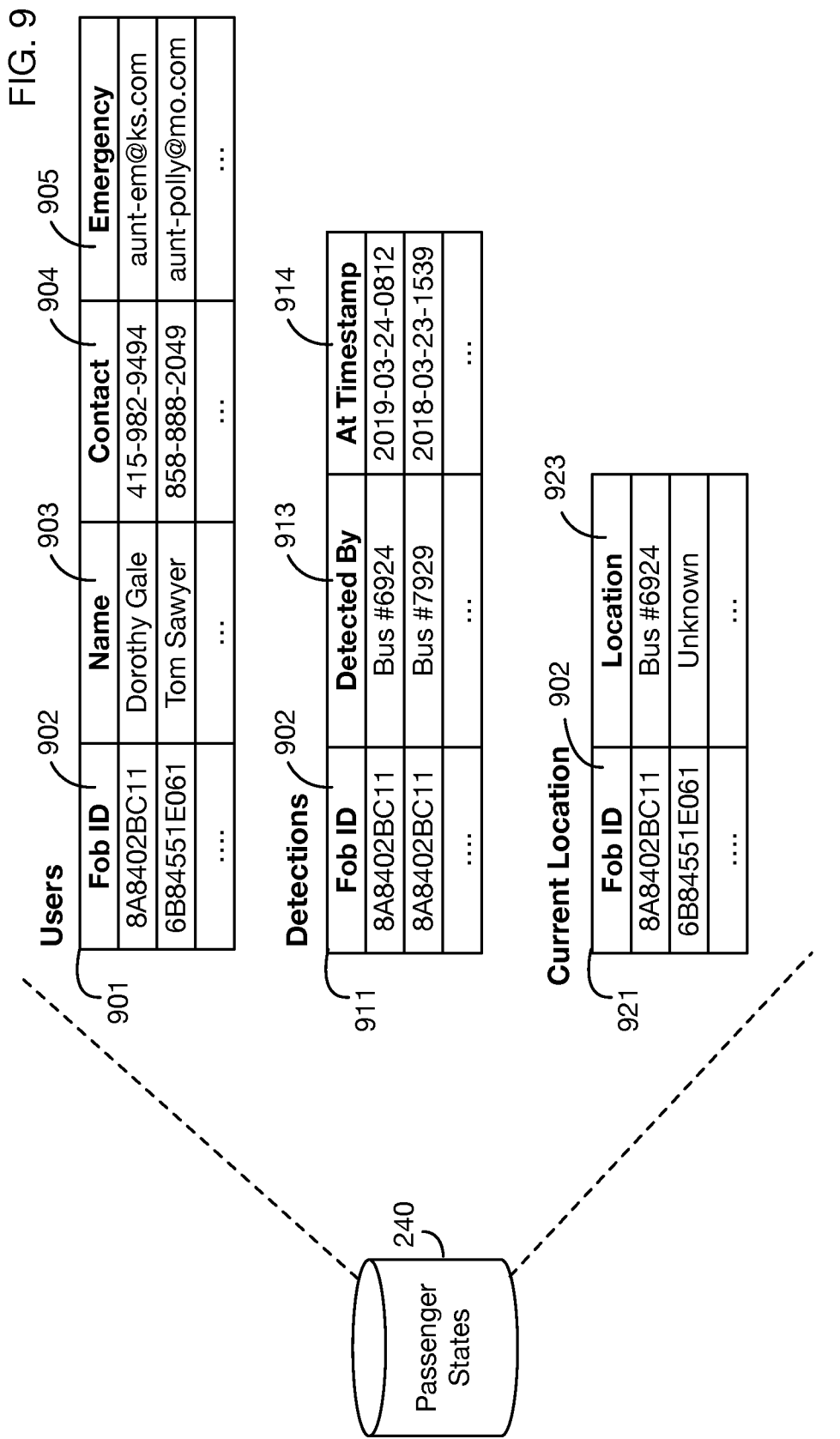
FIG. 9 shows illustrative tables of a passenger states database.

FIG. 9 shows an illustrative database schema for a passenger states database 240. A users table 901 tracks static data associated with a fob id 902, such as the name 903 of the person who has the fob, a contact phone 904 for this person, and an emergency contact 905 for the person. Any other data associated with the fob or the user may be tracked in this table. A detections table 911 tracks each fob detection by a passenger detector. Each detection associates a fob id 902 with a detector 913 (which may be linked for example to a vehicle or a door) and a time of detection 914. A current location table 921 provides the location 923 of each fob id 902; this location may be unknown if the user associated with the fob is not on any tracked vehicle or other tracked area.

Figure 10:
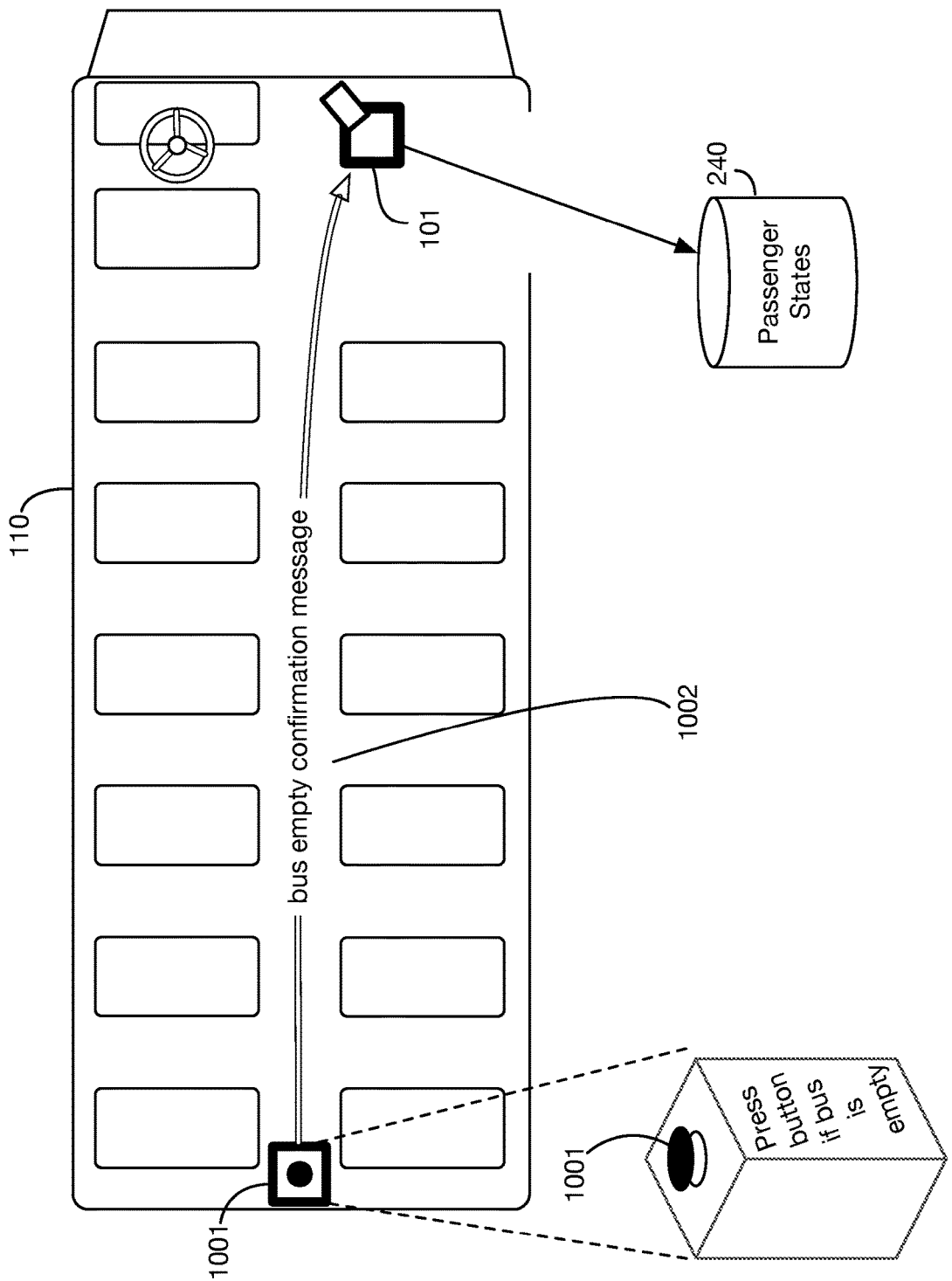
FIG. 10 shows an embodiment of the invention that includes a "bus empty" button that a driver may use to confirm that all passengers have left the bus.

One or more embodiments may include other user input controls that may be used to update or confirm passenger state information. FIG. 10 shows an illustrative example with a customized button 1001 at the back of bus 110. In this example, the bus driver follows a protocol to confirm that everyone has left the bus after passengers have supposedly all exited. The driver walks to the back of the bus, checking the seats, and then presses the button 1001 if he or she confirms that the bus is clear. Pressing the button 1001 transmits a message 1002 to the passenger detector or to another computer, which updates the passenger states database 240. One or more embodiments may use other types of user input controls for input of any passenger state information.

Figure 11:
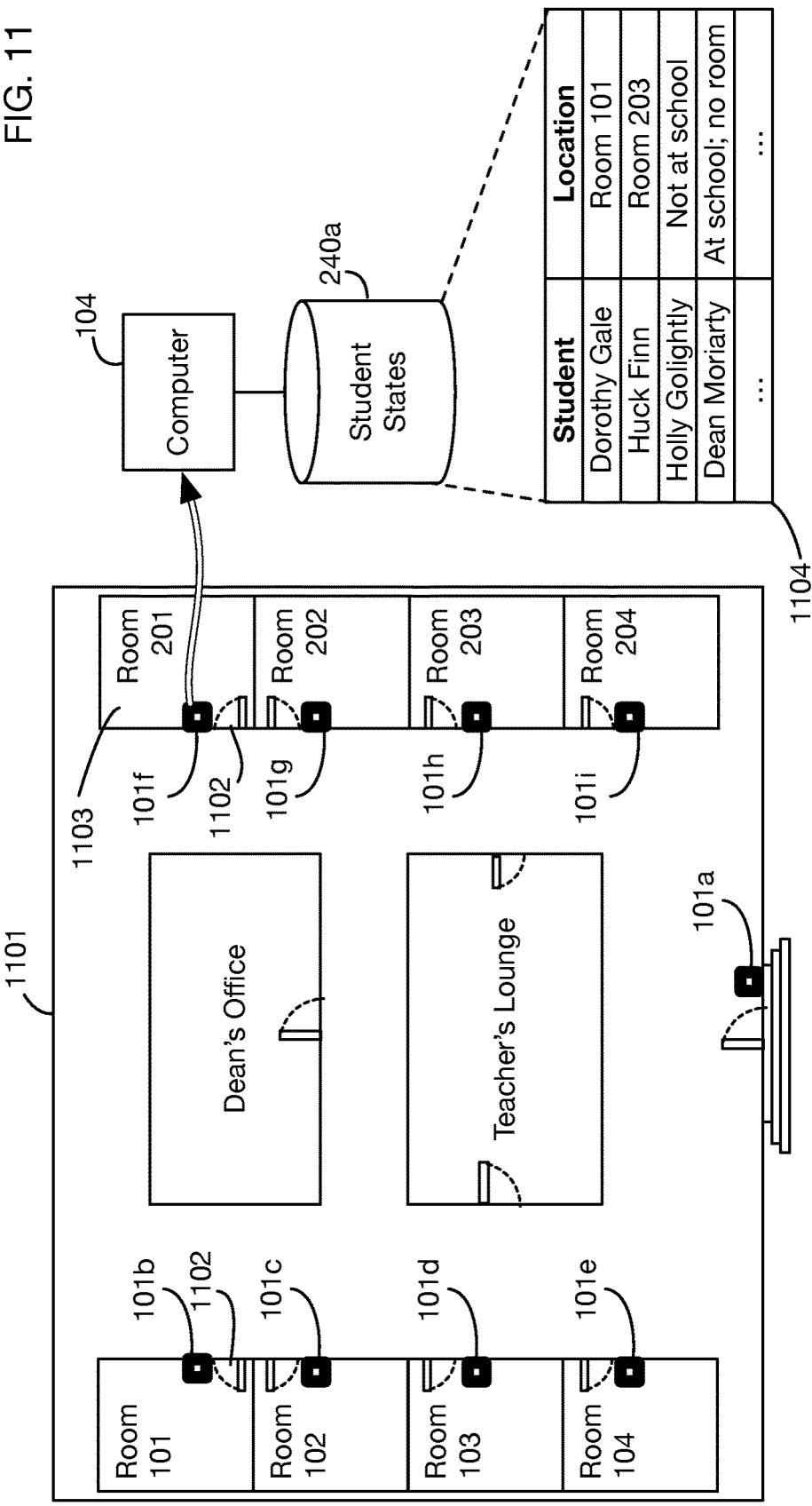
FIG. 11 shows an embodiment of the invention used to track the location of students in a school building, instead of in a transportation vehicle; the detector and fob technologies may be used for this and other tracking applications as well as for tracking passengers in a vehicle.

The examples shown above illustrate use of one or more embodiments of the invention to track passengers on a vehicle. One or more embodiments of the invention may be used for tracking of persons or fobs in other environments that may not be vehicles. FIG. 11 shows illustrative application to use an embodiment of the invention to track the location of students in a school. Selected doors in the school are equipped with detectors similar to or identical to the passenger detector 101 illustrated in FIG. 1 at the door to a bus. Students are equipped with fobs, and the detection process to determine that a student has passed by a door in the school may be essentially identical to the process described above for tracking passengers passing by a door to a bus. The school installs a detector 101a at the main entrance door to the school, and detectors 101b through 101i at the doors to classrooms. For example, detector 101f is positioned near door 1102 of classroom 1103. Detections by detector 101f and by the other door detectors are transmitted to a computer 104, which updates a database 240a of student states. The database 240a may for example have a table 1104 that associates each student with a current location.

In other applications of the invention, fobs may be attached to items instead of or in addition to people. For example, fobs may be attached to items in a museum, and detectors may be installed at the doors to rooms and at doors to the museum. Unauthorized movement of these items may therefore be tracked by the detectors.

While the invention herein disclosed has been described by means of specific embodiments and applications thereof, numerous modifications and variations could be made thereto by those skilled in the art without departing from the scope of the invention set forth in the claims.

What is claimed is:

1. A low-power, secure passenger tracking system comprising:
a passenger detector configured to be located in or proximal to a vehicle, said passenger detector comprising
a detector processor;
a magnetic transmitter configured to repeatedly transmit a varying magnetic field comprising a pattern; and
a detector wireless transceiver coupled to said detector processor;
wherein said detector processor is configured to
repeatedly transmit an encoded request identity message via said detector wireless transceiver;
receive a plurality of encoded response messages via said detector wireless transceiver; and,
for each encoded response message of said plurality of encoded response messages,
decode said each encoded response message to obtain a response message comprising an identifier; and
transmit a fob detected message comprising said identifier or derived from said identifier;
a plurality of fobs, each fob of said plurality of fobs configured to be carried by, worn by, or coupled to a corresponding passenger, each fob comprising
a battery;
a memory in which a fob identifier is stored;
a fob processor coupled to said battery and to said memory, and configured to operate in a processor asleep mode or a processor awake mode, wherein said processor draws less power from said battery in said processor asleep mode than it draws in said processor awake mode;
a fob wireless transceiver coupled to said fob processor and configured to
operate in a transceiver asleep mode or a transceiver awake mode, wherein said fob wireless transceiver draws less power from said battery in said transceiver asleep mode than it draws in said transceiver awake mode; and
when operating in said transceiver awake mode,
receive incoming messages and forward said incoming messages to said fob processor; and
obtain outgoing messages from said fob processor and transmit said outgoing messages; and
a magnetic receiver configured to
receive said varying magnetic field; and,
convert said varying magnetic field to an electrical signal;
a pattern recognition circuit coupled to said magnetic receiver and to said fob processor,
and configured to
receive said electrical signal;
determine whether said electrical signal matches said pattern;

when said electrical signal matches said pattern, transmit a processor wakeup signal to said fob processor that switches said fob processor to said processor awake mode;

wherein when said fob processor is awakened by said processor wakeup signal, said fob processor transmits a transceiver wakeup signal to said fob wireless transceiver that switches said fob wireless transceiver to said transceiver awake mode; and, said fob processor is further configured to decode said incoming messages to obtain decoded incoming messages; and when a decoded incoming message of said decoded incoming messages matches a request identity message, transmit an encoded response message comprising said fob identifier.

2. The system of claim 1, wherein said magnetic transmitter is further configured to transmit a varying magnetic field with a field strength that falls below a field strength threshold at a distance greater than a distance threshold from said magnetic transmitter; and, said magnetic receiver is further configured not to respond to a magnetic field below said field strength threshold.

3. The system of claim 2, wherein said distance threshold is equal to or less than two meters.

4. The system of claim 2, wherein said magnetic transmitter is further configured to transmit a varying magnetic field with a field strength that decreases substantially as an inverse cube of a distance from said magnetic transmitter.

5. The system of claim 2, wherein said magnetic transmitter comprises one or more inductors driven by an alternating current at a first frequency;

wherein said detector wireless transceiver transmits and receives at a second frequency or frequencies different from said first frequency.

6. The system of claim 5, wherein said one or more inductors comprise three inductors that are substantially perpendicular.

7. The system of claim 5, wherein said first frequency is at or below 9 kilohertz.

8. The system of claim 5, wherein said pattern comprises a binary sequence comprising two or more bits;

said magnetic transmitter couples said one or more inductors to said alternating current to transmit a one bit of said binary sequence; and, said magnetic transmitter decouples said one or more inductors from said alternating current to transmit a zero bit of said binary sequence.

9. The system of claim 1, wherein said magnetic receiver comprises an inductor.

10. The system of claim 9, wherein said magnetic transmitter comprises one or more inductors driven by an alternating current at a first frequency;

said magnetic receiver further comprises a capacitor; and, a resonant frequency of said magnetic receiver substantially matches said first frequency.

11. The system of claim 10, wherein said magnetic receiver is coupled to said battery;

said magnetic receiver further comprises an amplifier; and, said magnetic receiver draws a current from said battery of one microamp or less.

12. The system of claim 1, wherein said pattern recognition circuit comprises an FPGA.

13. The system of claim 12, wherein said FPGA is coupled to said battery; and, said FPGA draws a current from said battery of one microamp or less.

14. The system of claim 1, further comprising:

a computer comprising a database of passenger states coupled to said computer;

a user interface coupled to said computer; and, a network connection between said computer and said passenger detector;

wherein said passenger detector is further configured to transmit said fob detected message to said computer via said network connection;

said computer is configured to update said database of passenger states based on said fob detected message; and, display information from said database of passenger states on said user interface.

15. The system of claim 14, wherein said computer comprises a server remote from said passenger detector.

16. The system of claim 14, wherein said user interface comprises a web page.

17. The system of claim 14, wherein said user interface comprises a display in said vehicle.

18. The system of claim 14, wherein said passenger detector is located at or proximal to a passage through which passengers enter and exit said vehicle; and, said computer is further configured to determine whether a fob detected message indicates a passenger entry or a passenger exit.

19. The system of claim 18, further comprising:

a user interface control located at an end of said vehicle opposite said passage and coupled to said computer;

wherein when said user interface control is activated, said user interface control transmits a vehicle empty confirmation message to said computer; and, said computer updates said database of passenger states based on said vehicle empty confirmation message.

20. A low-power, secure passenger tracking system comprising:

a passenger detector located in or proximal to a vehicle, said passenger detector comprising a detector processor;

a magnetic transmitter configured to repeatedly transmit a varying magnetic field;

wherein said varying magnetic field comprises a pattern that comprises a binary sequence comprising two or more bits;

said magnetic transmitter comprising three inductors that are substantially perpendicular coupled to an alternating current at a first frequency at or below 9 kilohertz;

a field strength of said varying magnetic field falls below a field strength threshold at a distance greater than two meters from said magnetic transmitter;

a detector wireless transceiver coupled to said detector processor that transmits and receives at a second frequency different from said first frequency;

wherein said detector processor is configured to
repeatedly transmit an encoded request identity message via said detector wireless transceiver;
receive a plurality of encoded response messages via said detector wireless transceiver; and,
for each encoded response message of said plurality of encoded response messages,
decode said each encoded response message to obtain a response message comprising an identifier; and
transmit a fob detected message comprising said identifier or derived from said identifier;

a plurality of fobs, each fob of said plurality of fobs configured to be carried by, worn by, or coupled to a corresponding passenger, each fob comprising
a battery;
a memory in which a fob identifier is stored;
a fob processor coupled to said battery and to said memory, and configured to operate in a processor asleep mode or a processor awake mode, wherein said processor draws less power from said battery in said processor asleep mode than it draws in said processor awake mode;
a fob wireless transceiver coupled to said fob processor and configured to
operate in a transceiver asleep mode or a transceiver awake mode, wherein said fob wireless transceiver draws less power from said battery in said transceiver asleep mode than it draws in said transceiver awake mode; and
when operating in said transceiver awake mode,
receive incoming messages and forward said incoming messages to said fob processor; and
obtain outgoing messages from said fob processor and transmit said outgoing messages; and
a magnetic receiver comprising
an inductor;
a capacitor; and
an amplifier coupled to said battery and configured to draw a current from said battery of one microamp or less;

wherein
a resonant frequency of said magnetic receiver substantially matches said first frequency;
said magnetic receiver is configured to
receive said varying magnetic field; and,
when said field strength of said varying magnetic field is greater than or equal to said field strength threshold, convert said varying magnetic field to an electrical signal;
a pattern recognition circuit comprising an FPGA coupled to said magnetic receiver, to said fob processor, and to said battery and configured to draw a current of one microamp or less from said battery;
receive said electrical signal;
determine whether said electrical signal matches said pattern;
when said electrical signal matches said pattern, transmit a processor wakeup signal to said fob processor that switches said fob processor to said processor awake mode;

wherein
when said fob processor is awakened by said processor wakeup signal, said fob processor transmits a transceiver wakeup signal to said fob wireless transceiver that switches said fob wireless transceiver to said transceiver awake mode; and,
said fob processor is further configured to
decode said incoming messages to obtain decoded incoming messages; and
when a decoded incoming message of said decoded incoming messages matches a request identity message, transmit an encoded response message comprising said fob identifier;

a computer;
a database of passenger states coupled to said computer;
a user interface coupled to said computer; and,
a network connection between said computer and said passenger detector;
wherein
said passenger detector is further configured to transmit said fob detected message to said computer via said network connection;
said computer is configured to
update said database of passenger states based on said fob detected message; and,
display information from said database of passenger states on said user interface.

* * * * *